United States Patent [19]

Beck

[11] 4,412,656

[45] Nov. 1, 1983

[54] FLUID DELIVERY VALVE EXTENDER FOR EXTERMINATING APPARATUS AND THE LIKE

[76] Inventor: Barry Beck, 67-41 Burns St., Forest Hills, N.Y. 11375

[21] Appl. No.: 371,099

[22] Filed: Apr. 23, 1982

[51] Int. Cl.³ .............................................. B05B 9/04
[52] U.S. Cl. .................................. 239/373; 239/281; 239/532; 239/588
[58] Field of Search ............... 239/525, 526, 587, 588, 239/165, 281, 532, 586, 373; 15/144

[56] References Cited

U.S. PATENT DOCUMENTS

| | | | |
|---|---|---|---|
| 1,087,634 | 2/1914 | Boyce | 239/281 |
| 2,905,194 | 9/1959 | Smith et al. | 239/281 |
| 2,948,479 | 8/1960 | Graceman | 239/588 |
| 4,013,225 | 3/1977 | Davis | 239/281 |

FOREIGN PATENT DOCUMENTS

| | | | |
|---|---|---|---|
| 111481 | 7/1964 | Czechoslovakia | 239/588 |
| 208870 | 11/1966 | Sweden | 15/144 |
| 346270 | 4/1931 | United Kingdom | 239/588 |

*Primary Examiner*—John J. Love
*Assistant Examiner*—Jon M. Rastello
*Attorney, Agent, or Firm*—Sprung, Horn, Kramer & Woods

[57] ABSTRACT

A fluid delivery valve extender has a telescopable rod comprising at least two telescoping sections and having a first end and a relatively movable second end. An adapter is connected to the first end of the rod and includes a fluid passage having an inlet and an outlet. The adapter is releasably connectable to a fluid delivery valve outlet to put the inlet of the fluid passage in fluid communication with the valve outlet. A normally contracted, elastically deformable, coiled hose is disposed coaxially and loosely around the rod and has one end connected to the outlet of the fluid passage in fluid communication therewith the other end of the hose is connected to said second end of the rod for movement therewith and a discharge nozzle is connected in fluid communication with the hose to effect discharge of fluid passing through the hose. The fluid discharge nozzle is disposable at desired distances from the delivery valve by the extension of the rod and the expansion of the coiled hose.

9 Claims, 7 Drawing Figures

U.S. Patent   Nov. 1, 1983   Sheet 1 of 2   4,412,656
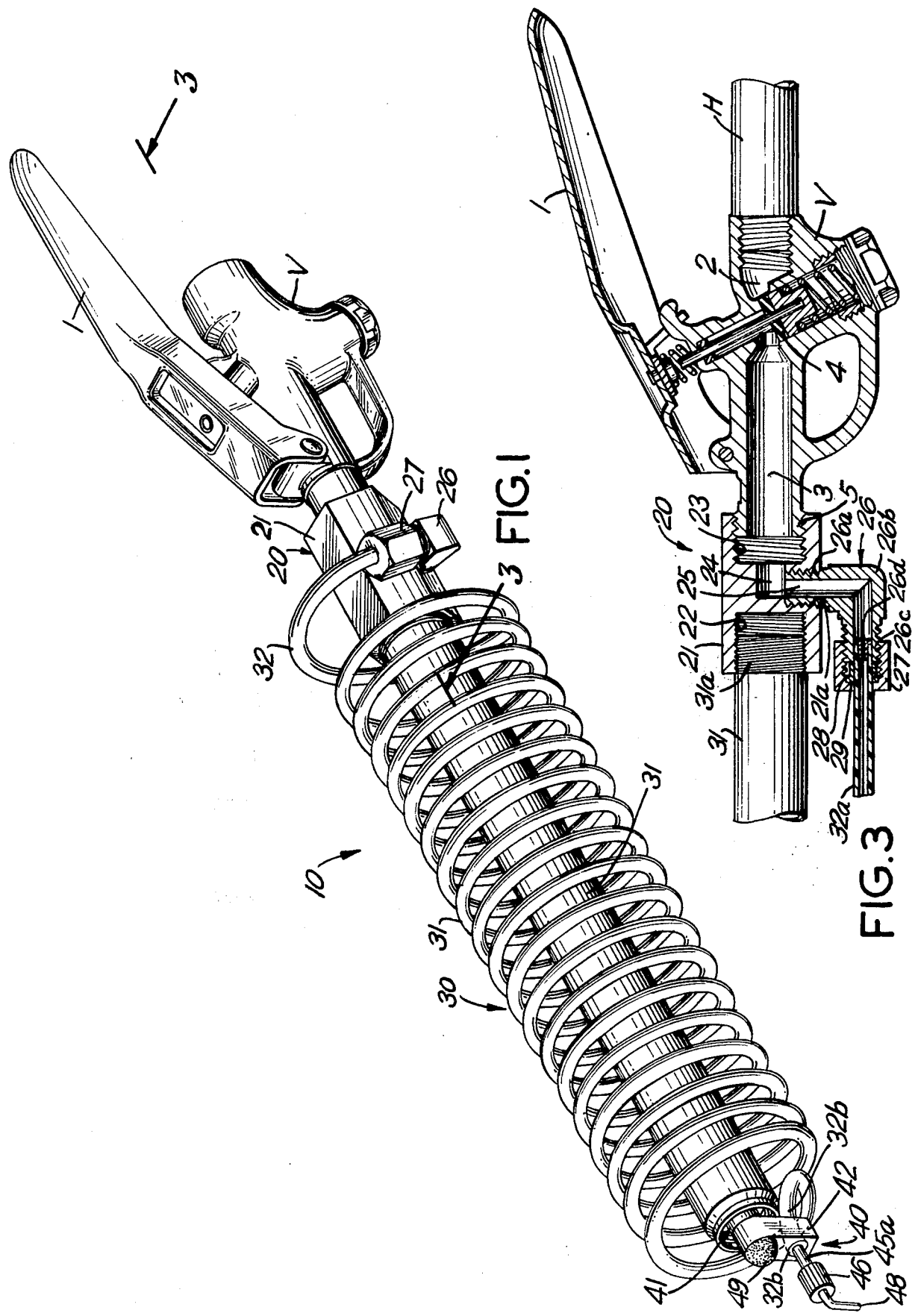

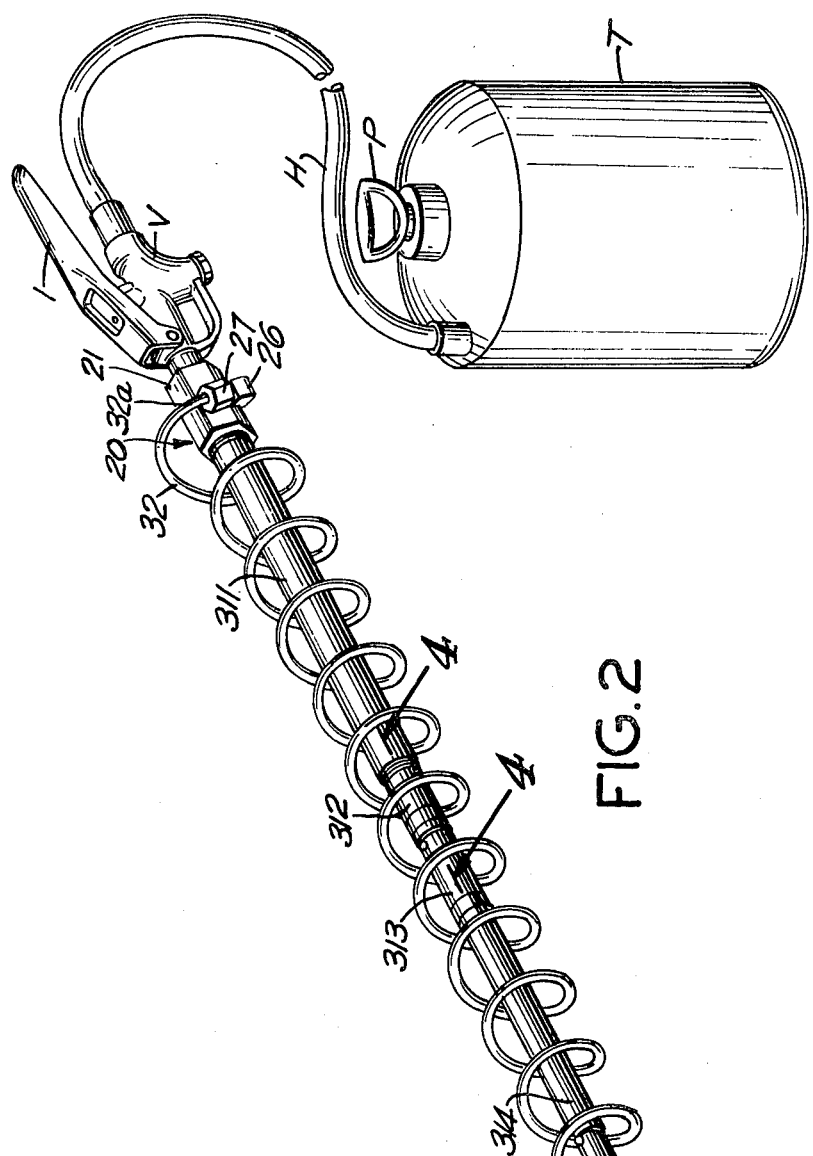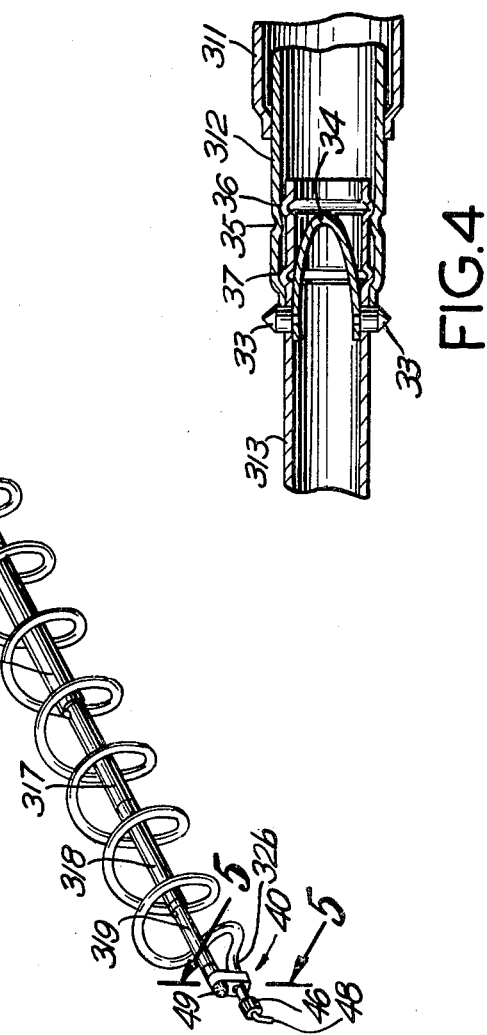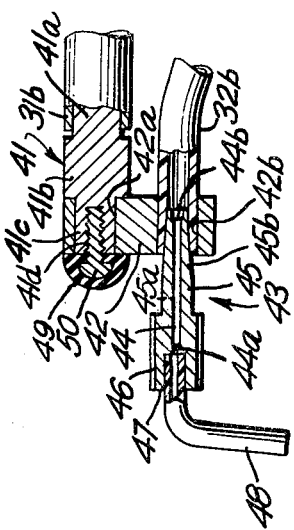

FLUID DELIVERY VALVE EXTENDER FOR EXTERMINATING APPARATUS AND THE LIKE

BACKGROUND OF THE INVENTION

The present invention relates to a fluid delivery valve extender for exterminating apparatus and the like.

In conventional fluid delivery systems such as spraying apparatus for insecticides, the insecticide liquid is held under pressure in a tank and delivered through a hose to a trigger valve which is actuatable to deliver liquid out of a discharge nozzle which is spaced at a distance therefrom by an extender wand or the like.

Due to the fact that exterminating apparatus are generally designed so as to be portable so that they can be used in on-site applications, the length of extender tubes for such apparatus has been limited. While it is desirable for the user to position the spray nozzle as close to the area to be sprayed as possible, the use of extender tubes of more than two feet have not proved to be feasible due to the nonportability thereof.

Purveyors of food and other products where sanitary conditions are essential, have found a greater need for regular applications of insecticides due to the increased enforcement of health code regulations, but on the other hand, it has been just as important to prevent the inadvertent spraying of insecticides and other chemicals on food handling equipment as well as the food itself. The conventional extender units do not prevent the spraying of the liquids on food during extermination due to the their insufficient length and inability to accurately deliver the liquid to the particular spot where the liquid is to be applied. During spraying, if the liquid must travel in the air prior to reaching the spot that it is to be applied, the chances of inadvertent and undesirable applications are increased considerably.

SUMMARY OF THE INVENTION

The main object of the present invention is to provide an improved extender for a fluid delivery valve which overcomes the disadvantages of conventional extenders and which is particularly suitable for extermination apparatus in that it minimizes undesired spraying of the surroundings, and the related odor it causes, makes for a more efficient use of the liquid to be sprayed and reduces reaching and bending by the user.

Another object of the present invention is to provide a fluid delivery valve extender which is capable of fully extending to 42" in length, while being able to compress downward to 8" to retain its ability to be portable. Additionally, the extender can be adjusted during use to any length between 8" and 42".

Another object of the present invention is to provide a fluid delivery valve extender which is reliable, easy to manufacture and which is particularly advantageous for use with exterminating apparatus.

These and other objects of the present invention are achieved in accordance with the present invention by a fluid delivery valve extender comprising a telescopable rod including at least two telescoping sections. The extender has adapter means connected to the rod at one end thereof and which forms a fluid passage having an inlet which can be releasably connected to a fluid delivery valve outlet to put the inlet of the fluid delivery passage in fluid communication therewith. A normally contracted elastically deformable coiled hose is disposed coaxially and loosely around the rod and has one end connected to the outlet of the fluid passage in fluid communication therewith. Second means connects the other end of the hose to the other end of the rod for movement therewith and includes means connected in fluid communication with the hose to effect discharge of fluid passing through the hose. As a result, the fluid discharge means is disposable at any one of a plurality of desired distances from the delivery valve by the extension of the rod and the expansion of the coiled hose.

The rod, in a particularly advantageous embodiment, has a plurality of tubular sections which also include means for releasably locking the sections in their fully telescoped positions to prevent the inadvertent contraction of the rod during use and also retaining the sections in intermediate positions if desired.

In the preferred embodiment of the present invention, for use with exterminating apparatus, the adapter means comprises an elongated metal body, preferably brass, with one internally threaded end for connecting to the rod and an internal thread at the other end for connecting to conventional trigger valves. A bore in the adapter body has one end which extends into the valve connection end and another end which opens into an L-shaped fitting which is connected to one end of the hose. The hose is preferably Nylon 11 which is particularly useful due to its ability to be inert to the chemicals used with regard to exterminating.

The second connecting means comprises a member fixed to the outer end of the rod and which has a throughbore therein parallel to the rod for closely receiving the other end of the hose. A discharge nozzle having a gradually tapered frusto conical tube is configured to be tightly received in the other end of the hose disposed in the throughbore with the internal passage thereof in communication with the hose. A cylindrical tip holding portion of the discharge nozzle has a substantially cylindrical bore therein so as to be receptive of a nozzle tip.

In a particularly advantageous embodiment of the present invention, an L-shaped tubular tip can be connected to the tip holder so as to enable the user to apply exterminating liquid to hard to reach and heretofore unreachable places.

The rod is also preferably provided with a rubber tip at the terminus thereof so as to enable the user to compress the rod by banging same on a hard surface such as the floor or a table without damaging the apparatus or the hard surface.

The above, and other objects, features and advantages of the present invention will be apparent in the following detailed description of preferred embodiments which is to be read in connection with the accompanying drawings, wherein:

BRIEF DESCRIPTION OF THE DRAWINGS

FIG. 1 is a perspective view of the fluid delivery valve extender in the contracted state;

FIG. 2 is a perspective view of the extender of FIG. 1 in an extended state;

FIG. 3 is a partial sectional view of the adapter means according to the invention;

FIG. 4 is a sectional view of the construction of the telescoping rod;

FIG. 5 is a partial sectional view of the discharge end of the present invention; and FIGS. 6a and 6b are partial sectional views of alternative fluid delivery tips.

DETAILED DESCRIPTION OF THE INVENTION

Referring now to FIGS. 1 and 2, the fluid delivery valve extender 10 according to the present invention is shown connected to a fluid delivery trigger valve V and to exterminating apparatus including tank T with pump P and connecting hose H.

The extender 10 is contemplated to be used with any conventional fluid delivery valve such as the trigger Tee-jet valve manufactured by B&G Equipment Company of Plumsteadville, Pennsylvania. A valve of this type, as shown in further detail in FIG. 3, has an inlet 2 connectable to a hose H and a valve member 4 which selectively enables fluid to pass from the inlet to the externally threaded outlet 5 thereof through fluid passage 3. The remaining exterminating apparatus shown in FIG. 2 is conventional and can be, for example, a T-50 tank, a PH-265 pump assembly and D-50 hose unit all available from the B&G Equipment Company.

As shown, the fluid delivery valve extender 10 comprises three sections, the inlet section 20 including adapter means as will be explained hereinafter, the expanding or extending section 30 including a telescopable rod 31 and a coiled hose 32, and the outlet section 40, which will also be explained hereinafter.

The extending section 30 comprises the telescopable rod 31 which may comprise at least two telescoping sections, preferably at least three and most advantageously a plurality of sections 311–319, which enable the rod 31 to contract downwardly to approximately 8" while extend to a maximum of approximately 42" in length.

The rod 31 preferably has means for releasably locking the individual sections thereof in the fully extended state. This means is shown in FIG. 4 and comprises projections 33 which are spring biased outwardly by a U-shaped projecting spring 34 and protrude through suitable apertures disposed in each of the sections. When the rod 313 is fully extended relative to rod 312, the projections 33 extend outwardly from the tubular section 313 and abut against the end of section 312 to prevent longitudinal movement. In order to withdraw section 213 back into section 312, projections 33 are merely pushed inwardly against the action of spring 34. Alternatively, if a sharp force is applied to the end of the rod, the coaction of the end of section 312 against projections 33 will force them inwardly and effect contraction. The releasable retaining of the sections relative to one another in the fully extended state is further aided by the use of coactive detents 36 and 37 on section 313 and detent 35 on section 312. The other sections have similar structure thereon for carrying out the releasable retention in the fully extended state. When the projections 33 are forced inwardly by a tubular section which is in less than its fully extended position, that is an intermediate position, the spring 34 exerts sufficient force on the projections 33 to make them useful to retain the sections in their intermediate positions if desired. Thus the rod can be adjusted to any length between its fully contracted and fully extended lengths during use and maintain that length without inadvertant undesired contraction or expansion.

The rod 31 has an externally threaded one end 31A and another end 31B which is relatively movable towards and away from end 31A. End 31A is releasably received, as shown in FIG. 3, in body 21 having an internally threaded bore 22 therein.

The hose 32 in accordance with the present invention is shown in a helical coil configuration which is normally contracted, as shown in FIG. 1 and which is expandable as shown in FIG. 2. The hose also preferably is elastically deformable and thus returns to its original contracted state shown in FIG. 1 upon the compression of rod 31.

The hose 32 is concentrically disposed about the rod 31 and is preferably loosely disposed therearound to enable it to expand to the state shown in FIG. 2.

In the preferred embodiment thereof for use with extermination apparatus, the hose is composed of nylon 11, has an internal diameter of $\frac{1}{8}$" and a nominal outside coil diameter of $1\frac{3}{4}$". Such a coiled hose is available as part number 121121 from the Nycoil Company of Fanwood, N.J.

The inlet end 32a of hose 32 is connected to an elbow shaped fitting 26 shown in more detail in FIG. 3. The hose connection includes a ferrule 29 and insert 28 to provide a fluid tight compression connection via nut 27 to the threaded end 26c of fitting 26. The other threaded end 26a thereof is received in a threaded hole 21a in body 21. The elbow fitting 26 includes the main body portion 26b and a throughbore 25 therein which has the constriction 26d for providing an abutting surface for insert 28. The elbow fitting 26 is preferably part 00204, the nut is preferably part 00202 and the ferrule and insert are preferably parts 00203 all available from the Nycoil Company.

The outlet end of elbow fitting 26 is preferably disposed at a 45 degree angle with respect to the longitudinal axis of the rod 31.

The inlet section 20 is provided for obtaining fluid communication with the outlet of a valve V. Conventional valves such as the one shown have standard externally threaded outlets, however it is contemplated that different adapter bodies 21 will be provided having different internally threaded portions 23 so as to make the extender according to the present invention usable with valves from different manufacturers.

The body 21 has means forming a fluid passage 24 therein so as to provide fluid communication between the throughbore 25 and fitting 26 and the outlet passage 3 of the valve V. The adapter body 21 can be made from plastics such as nylon, however in the preferred embodiment for use with exterminating apparatus, the body 21 is preferably made of metal, preferably brass or copper. Fitting 26 along with the nut, ferrule and insert are also preferably made of brass for use in exterminating apparatus.

In use, as shown in FIG. 3, upon the actuation of trigger 1, valve member 4 is removed from the path between inlet chamber 2 and outlet passage 3 of valve V whereupon fluid under pressure from tank T passes through hose H, through passage 24 and adapter 21 and into hose 32 through the fitting 26.

The means connecting end 32b of hose 32 to end 31a of rod 31 and for providing fluid discharge is shown in more detail in FIG. 5, in conjunction with FIGS. 1 and 2.

The connecting means comprises a connecting member 41 having a reduced diameter portion 41a which is force fitted into the end 32b of rod 32. Member 41 further comprises a reduced diameter extension 41c extending from cylindrical portion 41b and which has an internally threaded bore 41d therein.

Connected to portion 41c is hose holding member 42 which has a throughbore 42a therein which is received around portion 41c preferably in a force fitting manner. The member 42 also includes bore 42b which has a longitudinal axis thereof parallel to the axis of rod 31. Bore 42b is configured to tightly receive hose end 32b therein.

Hose end 32b is further held in place by the nozzle tip 43 which includes tubular portion 45 having a frusto conical portion 45b which gradually tapers so as to provide a tight fit within hose end 32b. Conical portion 45b is followed by a generally cylindrical portion 45a and a tip holding portion 46 which includes a slightly tapering bore 47 therein for holding a tip 48. The nozzle 43 includes a throughbore 44 having a slightly widened inlet 44b and a constricted outlet portion 44a to provide a nozzle stream. The tip 48 is optionally disposed in the nozzle in the tip holding bore 47 where a stream is to be provided. In particular, the L-shaped nylon tip 48 enables the user to reach hard to reach cracks and crevices during the use of exterminating apparatus.

The discharge system according to the present invention is particularly adaptable to other tips such as those shown in FIGS. 6a and 6b. FIG. 6a shows the use of a crack or crevice nozzle 48' which is an extended nylon tube, while FIG. 6b shows the fan spray type nozzle 48" which has an elongated slit at the discharge end thereof.

The extender also includes a rubber tip 49 having a screw 50 embedded therein which is received in internally threaded bore 41d.

Upon the finishing of the spraying of the fluid, the entire nozzle assembly 48 and 43 is removed from the end of hose 32b whereupon the rod can be sharply struck with the rubber tipped end thereof against the floor or a table in order to effect contraction thereof to the state shown in FIG. 1.

While the present invention is particularly commercially advantageous for use with exterminating equipment due to its ability to be portable and yet extend to substantial lengths in order to provide a long reach for the user, it is clear that the extender can be used to deliver other types of liquids and gases where desired.

It will be appreciated that the instant specification and claims are set forth by way of illustration and not limitation, and that various modifications and changes may be made without departing from the spirit and scope of the present invention.

What is claimed is:

1. A fluid delivery valve extender comprising:
  a. a telescopable rod comprising a plurality of telescoping tubular sections and having a first end and a relatively movable second end and means for releasably locking the sections in their fully telescoped positions;
  b. adapter means connected to said rod at said first end and comprising an elongated body with one internally threaded end for connecting to said first end of the rod, means forming a fluid passage in the body having an inlet and an outlet, first means for releasably connecting the adapter means to a fluid delivery valve outlet to put the inlet of the fluid passage in fluid communication with the valve outlet comprising an internal thread at the other end of the body, wherein the means forming the fluid passage comprises a bore having one end extending into said other internally threaded end and the other end opening along the side wall of the body with an L-shaped fitting connected thereto;
  c. a normally contracted, elastically deformable, coiled nylon hose disposed coaxially and loosely around the rod and having one end connected by the L-shaped fitting to the outlet of said fluid passage and in fluid communication therewith; and
  d. second means connecting the other end of the hose to said second end of the rod for movement therewith including means connected in fluid communication with said hose to effect discharge of fluid passing through the hose comprising a first member fixed to said second end of the rod and having a throughbore therein parallel to the rod and closely receiving the other end of the hose therein, an elongated discharge nozzle having a gradually tapering frusto-conical tube configured to be tightly received in the other end of the hose disposed in the throughbore with the internal passage thereof in communication with the hose and a cylindrical tip holding portion having a substantially cylindrical bore therein receptive of a nozzle tip for disposing same in fluid communication with the internal passage of the nozzle tube; whereby the fluid discharge means is disposable at desired distances from a delivery valve by the extension of the rod and the expansion of the coiled hose.

2. The extender according to claim 1, further comprising an L-shaped tubular tip connected to said tip holder.

3. The extender according to claim 1, further comprising a rubber tip at the terminus of said second end of the rod.

4. The extender according to claim 1, wherein the locking means includes means for releasably retaining the tubular sections in positions intermediate of their fully telescoped and fully contracted positions.

5. In an exterminating liquid discharge system having an exterminating liquid tank for holding exterminating liquid under pressure, a liquid delivery trigger valve connected to the tank by a flexible hose and having a liquid outlet and an extender for disposing the liquid discharge at a distance from the valve outlet, the improvement wherein the extender comprises:
  a. a telescopable rod comprising a plurality of telescoping tubular sections and having a first end and a relatively movable second end and means for releasably locking the sections in their fully telescoped positions;
  b. adapter means connected to said rod at said first end and comprising an elongated body with one internally threaded end for connecting to said first end of the rod, means forming a liquid passage in the body having an inlet and an outlet, first means for releasably connecting the adaptor means to the liquid delivery valve outlet to put the inlet of the liquid passage in liquid communication with the valve outlet comprising an internal thread at the other end of the body, wherein the means forming the fluid passage comprises a bore having one end extending into said other internally threaded end and the other end opening along the side wall of the body with an L-shaped fitting connected thereto;
  c. a normally contracted, elastically deformable, coiled nylon hose disposed coaxially and loosely around the rod and having one end connected by the L-shaped fitting to the outlet of said fluid passage and in liquid communication therewith; and d. second means connecting the other end of the hose to said second end of the rod for movement therewith including means connected in liquid communication with said hose to effect discharge of liquid passing through the hose comprising a first member fixed to said second end of the rod and having a throughbore therein parallel to the rod and closely receiving the other end of the hose therein, an elongated discharge nozzle having a gradually tapering frusto-conical tube configured to be tightly received in the other end of the hose disposed in the throughbore with the internal passage thereof in communication with the hose and a cylindrical tip holding portion having a substantially cylindrical bore therein receptive of a nozzle tip for disposing same in fluid communication with the internal passage of the nozzle tube; whereby the liquid discharge means is disposable at selected distances from the delivery valve by the extension of the rod and the expansion of the coiled hose.

6. The extender according to claim 5, wherein the hose is composed of nylon 11.

7. The extender according to claim 5, further comprising an L-shaped tubular tip connected to said tip holder.

8. The extender according to claim 5, further comprising a rubber tip at the terminus of said second end of the rod.

9. The extender according to claim 5, wherein the locking means includes means for releasably retaining the tubular sections in positions intermediate of their fully telescoped and fully contracted positions.

* * * * *